United States Patent
Gratzer

(10) Patent No.: US 10,787,246 B2
(45) Date of Patent: *Sep. 29, 2020

(54) WING TIP WITH WINGLET AND VENTRAL FIN

(71) Applicant: Aviation Partners, Inc., Seattle, WA (US)

(72) Inventor: Louis B. Gratzer, Seattle, WA (US)

(73) Assignee: Aviation Partners, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,202

(22) Filed: Aug. 8, 2019

(65) Prior Publication Data

US 2020/0001983 A1    Jan. 2, 2020

Related U.S. Application Data

(63) Continuation of application No. 16/167,259, filed on Oct. 22, 2018, now Pat. No. 10,377,472, which is a (Continued)

(51) Int. Cl.
   B64C 23/06 (2006.01)

(52) U.S. Cl.
   CPC .......... B64C 23/065 (2013.01); B64C 23/069 (2017.05); *Y02T 50/164* (2013.01)

(58) Field of Classification Search
   CPC ..... B64C 23/065; B64C 23/069; B64C 23/00; B64C 3/14; B64C 39/00; Y02T 50/164; Y02T 50/44
   See application file for complete search history.

(56) References Cited

U.S. PATENT DOCUMENTS

| 994,968 | A | * | 6/1911 | Barbaudy | B64C 3/14 244/35 R |
| 1,050,222 | A | * | 1/1913 | McIntosh | B64C 3/14 244/35 R |

(Continued)

FOREIGN PATENT DOCUMENTS

| CN | 1845848 A | 10/2006 |
| CN | 101596934 A | 12/2009 |

(Continued)

OTHER PUBLICATIONS

"Aviation Partners at NBAA 2100," dated Oct. 10, 2011.
(Continued)

*Primary Examiner* — Medhat Badawi
(74) *Attorney, Agent, or Firm* — Rutan & Tucker LLP

(57) ABSTRACT

A method of improving performance of an aircraft, including attaching a wing tip to a wing of the aircraft. The wing tip includes a winglet and a ventral fin. The winglet includes a winglet leading edge, a winglet trailing edge, an adapter section, a transition section attached to the adapter section, a blade section attached to the transition section, and a first tip section attached to the blade section. The ventral fin is coupled to the winglet at an attachment location adjacent the transition section. The ventral fin includes a second tip section. The wing has a wing leading edge and a wing trailing edge in a wing chord plane. Attaching the wing tip to the wing includes connecting the adapter section to the wing such that the winglet leading edge continuously transitions from the wing leading edge, and the winglet trailing edge continuously transitions from the wing trailing edge.

18 Claims, 4 Drawing Sheets

US 10,787,246 B2
Page 2

Related U.S. Application Data continuation of application No. 14/610,452, filed on Jan. 30, 2015, now Pat. No. 10,106,247, which is a continuation of application No. 13/493,843, filed on Jun. 11, 2012, now Pat. No. 8,944,386.

(60) Provisional application No. 61/495,236, filed on Jun. 9, 2011.

(56) References Cited

U.S. PATENT DOCUMENTS

| | | | | |
|---|---|---|---|---|
| 1,466,551 A | * | 8/1923 | Thurston | B64C 23/076 244/218 |
| 1,692,081 A | * | 11/1928 | La Cierva | B64C 27/023 416/131 |
| 1,710,673 A | * | 4/1929 | MacDonald | B64C 3/44 244/215 |
| 1,841,921 A | * | 1/1932 | Spiegel | B64C 23/069 244/199.4 |
| 1,888,418 A | * | 11/1932 | Adams | B64C 23/076 244/218 |
| 2,123,096 A | * | 7/1938 | Charp | B64C 3/10 244/35 R |
| 2,164,721 A | * | 7/1939 | Price | B64C 21/025 244/208 |
| 2,576,981 A | * | 12/1951 | Vogt | B64C 23/069 244/91 |
| 2,743,888 A | * | 5/1956 | Lippisch | B64C 23/076 244/199.4 |
| 2,775,419 A | * | 12/1956 | Hlobil | B64C 39/10 244/35 R |
| 2,805,830 A | * | 9/1957 | Zborowski | B64C 29/0091 244/35 R |
| 2,846,165 A | * | 8/1958 | Axelson | B64C 23/076 244/90 R |
| 3,027,118 A | * | 3/1962 | Willox | F02C 7/042 244/15 |
| 3,029,018 A | * | 4/1962 | Floyd, Jr. | G06G 7/46 703/9 |
| 3,128,371 A | * | 4/1964 | Spaulding | G06G 7/44 205/775 |
| 3,270,988 A | * | 9/1966 | Cone, Jr. | B64C 23/069 244/35 R |
| 3,684,217 A | * | 8/1972 | Kukon | B64B 1/00 244/36 |
| 3,712,564 A | * | 1/1973 | Rethorst | B64C 23/06 244/199.4 |
| 3,778,926 A | * | 12/1973 | Gladych | A63H 27/00 446/66 |
| 3,840,199 A | * | 10/1974 | Tibbs | B64C 23/005 244/207 |
| 4,017,041 A | * | 4/1977 | Nelson | B64C 23/076 244/198 |
| 4,046,336 A | * | 9/1977 | Tangler | B64C 27/463 244/198 |
| 4,093,160 A | * | 6/1978 | Reighart, II | B64C 23/06 244/113 |
| 4,108,403 A | * | 8/1978 | Finch | B64C 23/065 244/199.2 |
| 4,172,574 A | * | 10/1979 | Spillman | B64C 23/072 244/199.4 |
| 4,190,219 A | * | 2/1980 | Hackett | B64C 23/069 244/199.4 |
| 4,205,810 A | * | 6/1980 | Ishimitsu | B64C 23/065 244/91 |
| 4,240,597 A | * | 12/1980 | Ellis | B64C 3/14 244/35 R |
| 4,245,804 A | * | 1/1981 | Ishimitsu | B64C 23/069 244/91 |
| 4,247,062 A | * | 1/1981 | Brueckner | B64C 5/08 244/36 |
| 4,247,063 A | * | 1/1981 | Jenkins | B64C 5/08 244/91 |
| D259,554 S | * | 6/1981 | Parise | 244/199.4 |
| 4,365,773 A | * | 12/1982 | Wolkovitch | B64C 39/068 244/123.7 |
| 4,382,569 A | * | 5/1983 | Boppe | B64C 23/065 244/199.4 |
| 4,429,844 A | * | 2/1984 | Brown | B64C 3/48 244/219 |
| 4,444,365 A | * | 4/1984 | Heuberger | B64C 1/26 244/48 |
| 4,449,680 A | * | 5/1984 | Gratzer | B64D 29/02 244/130 |
| 4,449,681 A | * | 5/1984 | Gratzer | B64D 29/02 244/130 |
| 4,449,682 A | * | 5/1984 | Gratzer | B64D 29/02 244/130 |
| 4,449,683 A | * | 5/1984 | Gratzer | B64D 29/02 244/130 |
| 4,455,004 A | * | 6/1984 | Whitaker, Sr. | B64C 5/08 244/90 R |
| 4,457,479 A | * | 7/1984 | Daude | B64C 5/08 244/203 |
| 4,541,593 A | * | 9/1985 | Cabrol | B64C 39/068 244/45 R |
| 4,545,552 A | * | 10/1985 | Welles | B64C 39/10 244/90 R |
| 4,575,030 A | * | 3/1986 | Gratzer | B64C 9/146 244/209 |
| 4,595,160 A | * | 6/1986 | Santos | B64C 23/069 244/91 |
| 4,598,885 A | * | 7/1986 | Waitzman | B64C 3/185 244/13 |
| 4,605,183 A | * | 8/1986 | Gabriel | B64C 3/40 244/46 |
| 4,667,906 A | * | 5/1987 | Suarez | B64C 3/28 244/117 A |
| 4,671,473 A | * | 6/1987 | Goodson | B64C 23/076 244/199.4 |
| 4,674,709 A | * | 6/1987 | Welles | B64C 39/10 244/45 R |
| 4,700,911 A | * | 10/1987 | Zimmer | B64C 3/10 244/35 R |
| 4,706,902 A | * | 11/1987 | Destuynder | B64C 9/00 244/195 |
| 4,714,215 A | * | 12/1987 | Jupp | B64C 23/069 244/199.4 |
| 4,722,499 A | * | 2/1988 | Klug | B64C 23/076 244/199.4 |
| 4,776,542 A | * | 10/1988 | Van Dam | B64C 3/10 244/198 |
| 4,813,631 A | * | 3/1989 | Gratzer | B64C 9/146 244/209 |
| 4,949,919 A | * | 8/1990 | Wajnikonis | B63B 1/16 114/127 |
| 5,039,032 A | * | 8/1991 | Rudolph | B64C 3/10 244/35 R |
| 5,082,204 A | * | 1/1992 | Croston | B64C 39/066 244/126 |
| 5,096,382 A | * | 3/1992 | Gratzer | B63H 1/16 416/189 |
| 5,102,068 A | * | 4/1992 | Gratzer | B64C 5/08 244/35 R |
| 5,156,358 A | * | 10/1992 | Gerhardt | B64C 5/08 244/36 |
| 5,174,721 A | * | 12/1992 | Brocklehurst | B64C 27/463 416/223 R |
| 5,190,441 A | * | 3/1993 | Murphy | B64C 11/008 415/119 |
| 5,275,358 A | * | 1/1994 | Goldhammer | B64C 3/14 244/91 |
| 5,348,253 A | * | 9/1994 | Gratzer | B64C 23/069 244/91 |
| 5,407,153 A | * | 4/1995 | Kirk | B64C 23/069 244/199.4 |
| 5,634,613 A | * | 6/1997 | McCarthy | B64C 23/06 244/199.1 |

(56) References Cited

U.S. PATENT DOCUMENTS

| | | | | |
|---|---|---|---|---|
| 5,778,191 A | * | 7/1998 | Levine | H04N 19/00 375/E7.222 |
| 5,823,480 A | * | 10/1998 | La Roche | B64C 3/42 244/199.4 |
| 5,909,858 A | * | 6/1999 | Hawley | B64C 3/00 244/130 |
| 5,961,068 A | * | 10/1999 | Wainfan | B64C 3/10 244/130 |
| 5,975,464 A | * | 11/1999 | Rutan | B64C 39/02 244/118.2 |
| 5,988,563 A | * | 11/1999 | Allen | B64C 3/42 244/49 |
| 5,992,793 A | * | 11/1999 | Perry | B64C 27/463 244/17.11 |
| 6,089,502 A | * | 7/2000 | Herrick | B64C 3/10 244/35 R |
| 6,161,797 A | * | 12/2000 | Kirk | B64C 9/12 244/1 N |
| 6,161,801 A | * | 12/2000 | Kelm | B64C 13/16 244/195 |
| 6,227,487 B1 | * | 5/2001 | Clark | B64C 5/08 244/99.12 |
| 6,231,308 B1 | * | 5/2001 | Kondo | B64C 27/463 416/228 |
| 6,260,809 B1 | * | 7/2001 | Egolf | B64C 27/463 244/17.11 |
| 6,345,790 B1 | * | 2/2002 | Brix | B64C 23/076 244/199.4 |
| 6,467,732 B2 | * | 10/2002 | Tsukahara | B64C 27/463 244/17.11 |
| 6,474,604 B1 | * | 11/2002 | Carlow | B64C 39/062 244/198 |
| 6,484,968 B2 | | 11/2002 | Felker | |
| 6,547,181 B1 | * | 4/2003 | Hoisington | B60V 1/08 244/46 |
| 6,578,798 B1 | * | 6/2003 | Dizdarevic | B64C 23/069 244/199.1 |
| 6,722,615 B2 | | 4/2004 | Heller et al. | |
| 6,726,149 B2 | * | 4/2004 | Wojciechowski | B64C 3/00 244/119 |
| 6,743,504 B1 | * | 6/2004 | Allen | B29C 70/446 428/362 |
| 6,772,979 B2 | * | 8/2004 | Kubica | B64C 13/16 244/195 |
| 6,827,314 B2 | * | 12/2004 | Barriety | B64C 3/52 244/201 |
| 6,886,778 B2 | | 5/2005 | McLean | |
| 6,926,345 B2 | * | 8/2005 | Ortega | B62D 35/008 296/180.4 |
| 7,048,228 B2 | * | 5/2006 | Vassberg | B64C 3/28 244/216 |
| 7,275,722 B2 | | 10/2007 | Irving et al. | |
| 7,475,848 B2 | * | 1/2009 | Morgenstern | B64C 3/16 244/123.1 |
| D595,211 S | * | 6/2009 | Cazals | D12/345 |
| 7,597,285 B2 | * | 10/2009 | Schweiger | B64C 3/38 244/75.1 |
| 7,644,892 B1 | * | 1/2010 | Alford, Jr. | B64C 23/065 244/199.4 |
| 7,744,038 B2 | | 6/2010 | Sankrithi et al. | |
| 7,900,876 B2 | | 3/2011 | Eberhardt | |
| 7,900,877 B1 | * | 3/2011 | Guida | B64C 23/076 244/199.4 |
| 7,971,832 B2 | | 7/2011 | Hackett et al. | |
| 7,980,515 B2 | * | 7/2011 | Hunter | B64C 3/28 244/198 |
| 7,988,099 B2 | * | 8/2011 | Bray | B64C 5/08 244/199.4 |
| 7,988,100 B2 | | 8/2011 | Mann | |
| 7,997,875 B2 | * | 8/2011 | Nanukuttan | F03D 1/0675 416/237 |
| 8,083,185 B2 | * | 12/2011 | Konings | B64C 3/385 244/199.4 |
| 8,123,160 B2 | * | 2/2012 | Shepshelovich | B64C 39/028 244/13 |
| 8,241,002 B2 | * | 8/2012 | Wobben | F03D 1/0633 416/228 |
| 8,342,456 B2 | | 1/2013 | Mann | |
| 8,366,056 B2 | | 2/2013 | Garang | |
| 8,382,041 B1 | * | 2/2013 | Yechout | B64C 23/069 244/199.4 |
| 8,439,313 B2 | | 5/2013 | Rawdon et al. | |
| 8,444,389 B1 | * | 5/2013 | Jones | F01D 5/14 416/193 A |
| 8,490,925 B2 | | 7/2013 | Buescher et al. | |
| 8,651,427 B1 | * | 2/2014 | Malachowski | B64C 23/069 244/199.4 |
| D716,978 S | * | 11/2014 | Selvaag | D26/28 |
| 8,894,018 B2 | * | 11/2014 | Boer | B64C 23/072 244/199.4 |
| 8,944,386 B2 | | 2/2015 | Gratzer | |
| 9,038,963 B2 | | 5/2015 | Gratzer | |
| 9,381,999 B2 | | 7/2016 | Gratzer | |
| 9,505,484 B1 | * | 11/2016 | Al-Sabah | B64C 3/38 |
| 9,580,170 B2 | | 2/2017 | Gratzer | |
| 9,669,944 B2 | * | 6/2017 | Gagnon | B64D 47/02 |
| 9,738,375 B2 | | 8/2017 | Witte et al. | |
| 9,751,638 B1 | | 9/2017 | Gagnon et al. | |
| 10,005,546 B2 | | 6/2018 | Gratzer | |
| 10,106,247 B2 | | 10/2018 | Gratzer | |
| 10,232,934 B2 | | 3/2019 | Gratzer | |
| 10,252,793 B2 | | 4/2019 | Gratzer | |
| 2002/0092947 A1 | * | 7/2002 | Felker | B64C 23/069 244/35 R |
| 2002/0162917 A1 | * | 11/2002 | Heller | B64C 3/10 244/199.4 |
| 2003/0106961 A1 | * | 6/2003 | Wyrembek | B64C 9/32 244/113 |
| 2004/0169110 A1 | | 9/2004 | Wyrembek et al. | |
| 2004/0262451 A1 | * | 12/2004 | McLean | B64C 3/10 244/45 R |
| 2005/0013694 A1 | * | 1/2005 | Kovalsky | B64C 27/46 416/226 |
| 2005/0133672 A1 | * | 6/2005 | Irving | B64C 23/072 244/201 |
| 2005/0173592 A1 | * | 8/2005 | Houck, II | B63B 1/248 244/45 R |
| 2005/0184196 A1 | * | 8/2005 | Shmilovich | B64C 23/065 244/199.3 |
| 2006/0027703 A1 | * | 2/2006 | Bussom | B64C 27/463 244/17.13 |
| 2007/0018037 A1 | * | 1/2007 | Perlo | B64C 29/0041 244/45 R |
| 2007/0018049 A1 | * | 1/2007 | Stuhr | B64C 23/069 244/124 |
| 2007/0114327 A1 | * | 5/2007 | Dees | B64C 13/16 244/34 R |
| 2007/0131821 A1 | * | 6/2007 | Johan | B64C 3/14 244/91 |
| 2007/0252031 A1 | * | 11/2007 | Hackett | B64C 3/10 244/4 R |
| 2007/0262205 A1 | * | 11/2007 | Grant | B64C 23/076 244/199.2 |
| 2008/0116322 A1 | * | 5/2008 | May | B64C 23/076 244/199.4 |
| 2008/0145219 A1 | * | 6/2008 | McVeigh | B64C 23/06 416/23 |
| 2008/0191099 A1 | * | 8/2008 | Werthmann | B64C 23/065 244/199.4 |
| 2008/0223991 A1 | * | 9/2008 | Mann | B64C 23/069 244/199.4 |
| 2008/0308683 A1 | * | 12/2008 | Sankrithi | B64C 23/076 244/199.4 |
| 2009/0039204 A1 | * | 2/2009 | Eberhardt | B64C 23/069 244/199.4 |
| 2009/0065632 A1 | * | 3/2009 | Cazals | B64C 5/02 244/15 |

(56) References Cited

U.S. PATENT DOCUMENTS

| | | | | |
|---|---|---|---|---|
| 2009/0084904 A1* | 4/2009 | Detert | B64C 23/065 244/199.4 |
| 2009/0127861 A1* | 5/2009 | Sankrithi | F03B 13/264 290/54 |
| 2009/0148301 A1* | 6/2009 | Leahy | B64C 27/463 416/223 R |
| 2009/0194638 A1* | 8/2009 | Dennis | B64C 3/38 244/131 |
| 2009/0224107 A1* | 9/2009 | McLean | B64F 5/00 244/199.4 |
| 2009/0230240 A1* | 9/2009 | Osborne | B64C 9/32 244/87 |
| 2009/0232040 A1* | 9/2009 | Abdel-Kader | G01D 7/08 370/311 |
| 2009/0256029 A1* | 10/2009 | Malachowski | B64C 23/069 244/199.4 |
| 2009/0269205 A1* | 10/2009 | Leahy | B64C 27/463 416/226 |
| 2009/0283639 A1* | 11/2009 | Ackermann | B64C 3/18 244/131 |
| 2009/0302167 A1* | 12/2009 | Desroche | B64C 3/58 244/199.4 |
| 2010/0006706 A1* | 1/2010 | Breitsamter | B64C 13/16 244/199.3 |
| 2010/0019094 A1* | 1/2010 | Theurich | B64C 23/069 244/199.4 |
| 2010/0123047 A1* | 5/2010 | Williams | A63H 27/02 244/35 R |
| 2010/0155541 A1* | 6/2010 | Garang | B64C 23/065 244/199.4 |
| 2010/0163670 A1* | 7/2010 | Dizdarevic | B64C 1/0009 244/36 |
| 2010/0181432 A1* | 7/2010 | Gratzer | B64C 11/18 244/199.4 |
| 2010/0266413 A1* | 10/2010 | Naumenko | F03D 3/061 416/203 |
| 2011/0006165 A1* | 1/2011 | Ireland | B64C 23/06 244/200.1 |
| 2011/0024556 A1* | 2/2011 | Cazals | B64C 23/076 244/99.12 |
| 2011/0031354 A1* | 2/2011 | Kelleher | B64C 39/024 244/45 R |
| 2011/0042524 A1* | 2/2011 | Hemmelgarn | B64C 3/48 244/203 |
| 2011/0095128 A1* | 4/2011 | Schwarze | B64C 5/06 244/87 |
| 2011/0192937 A1* | 8/2011 | Buescher | B64C 23/069 244/199.4 |
| 2011/0260008 A1* | 10/2011 | Smith | F01D 5/145 244/199.4 |
| 2011/0272530 A1 | 11/2011 | Mann | |
| 2012/0027594 A1* | 2/2012 | Lewke | F03D 1/0633 416/146 R |
| 2012/0049007 A1 | 3/2012 | Hunter | |
| 2012/0049010 A1* | 3/2012 | Speer | B64C 23/065 244/45 R |
| 2012/0091262 A1* | 4/2012 | Rawdon | B64C 23/069 244/36 |
| 2012/0112005 A1* | 5/2012 | Chaussee | B64C 23/072 244/123.1 |
| 2012/0187251 A1* | 7/2012 | Guida | B64C 13/16 244/199.4 |
| 2012/0286102 A1* | 11/2012 | Sinha | B64C 15/00 244/7 B |
| 2012/0286122 A1* | 11/2012 | Tankielun | G01R 29/0864 248/346.06 |
| 2012/0312928 A1* | 12/2012 | Gratzer | B64C 23/069 244/199.4 |
| 2012/0312929 A1 | 12/2012 | Gratzer | |
| 2013/0092797 A1* | 4/2013 | Wright | B64C 3/58 244/199.4 |
| 2013/0256460 A1* | 10/2013 | Roman | B64C 3/58 244/199.4 |
| 2014/0117166 A1* | 5/2014 | Campbell, Jr. | B64C 23/069 244/199.4 |
| 2014/0159965 A1* | 6/2014 | Le | H01Q 1/28 343/705 |
| 2014/0306067 A1* | 10/2014 | Guida | B64C 23/076 244/199.4 |
| 2014/0328694 A1* | 11/2014 | Campbell, Jr. | B64D 45/00 416/241 R |
| 2014/0346281 A1* | 11/2014 | Gratzer | B64C 23/069 244/199.4 |
| 2015/0041597 A1* | 2/2015 | Theurich | B64C 23/065 244/199.4 |
| 2015/0203190 A1* | 7/2015 | Witte | B64C 23/069 244/199.4 |
| 2015/0217858 A1 | 8/2015 | Gratzer | |
| 2016/0009379 A1* | 1/2016 | Witte | B29C 70/44 244/1 A |
| 2016/0039379 A1* | 2/2016 | Saitoh | B60R 19/18 293/117 |
| 2016/0075429 A1* | 3/2016 | Fong | B64F 5/10 244/199.4 |
| 2016/0130012 A1* | 5/2016 | Laguia-Barnola | B64D 37/04 705/26.7 |
| 2016/0144969 A1* | 5/2016 | Rawdon | B64C 3/185 244/13 |
| 2016/0244146 A1* | 8/2016 | Harding | B64C 3/56 |
| 2016/0368595 A1 | 12/2016 | Gratzer | |
| 2017/0050723 A1* | 2/2017 | Witte | B29C 70/44 |
| 2017/0057622 A1 | 3/2017 | Gratzer | |
| 2017/0137116 A1* | 5/2017 | Ireland | B64C 23/06 |
| 2017/0233065 A1* | 8/2017 | Swanson | B64C 23/069 244/199.4 |
| 2017/0247105 A1* | 8/2017 | Heller | B64C 23/065 |
| 2017/0260966 A1* | 9/2017 | Gratzer | F03D 3/061 |
| 2018/0050790 A1* | 2/2018 | Whitehouse | B64C 23/069 |
| 2018/0319484 A1 | 11/2018 | Gratzer | |
| 2019/0055007 A1 | 2/2019 | Gratzer | |
| 2019/0210715 A1 | 7/2019 | Gratzer | |
| 2019/0233089 A1 | 8/2019 | Gratzer | |

FOREIGN PATENT DOCUMENTS

| | | |
|---|---|---|
| DE | 2149956 A1 | 4/1973 |
| DE | 3638347 A1 | 5/1988 |
| DE | 19752369 A1 | 5/1999 |
| DE | 20211664 U1 | 1/2003 |
| DE | 10207767 A1 | 9/2003 |
| EP | 0094064 A1 | 11/1983 |
| EP | 0122790 A1 | 10/1984 |
| EP | 0716978 A1 | 6/1996 |
| EP | 1375342 B1 | 12/2008 |
| EP | 1924493 B1 | 4/2009 |
| EP | 1883577 B1 | 1/2010 |
| EP | 2084059 B1 | 2/2012 |
| EP | 2274202 B1 | 2/2012 |
| EP | 2644498 A2 | 10/2013 |
| EP | 2792595 A1 | 10/2014 |
| EP | 2881321 A1 | 6/2015 |
| EP | 2610169 B1 | 10/2015 |
| EP | 2718183 B1 | 2/2018 |
| EP | 2718182 B1 | 4/2018 |
| FR | 405177 A | 12/1909 |
| FR | 418656 A | 12/1910 |
| FR | 444080 A | 10/1912 |
| FR | 726674 A | 6/1932 |
| GB | 2282996 A | 4/1995 |
| RU | 2233769 C1 | 8/2004 |
| WO | 1982004426 A1 | 12/1982 |
| WO | 1995011159 A1 | 4/1995 |
| WO | 2002047979 A2 | 6/2002 |
| WO | 20030000547 A1 | 1/2003 |
| WO | 2005099380 A2 | 10/2005 |
| WO | 2007031732 A1 | 3/2007 |
| WO | 2008061739 A1 | 5/2008 |
| WO | 2009/155584 A1 | 12/2009 |
| WO | 2010124877 A1 | 11/2010 |

(56) References Cited

FOREIGN PATENT DOCUMENTS

| WO | 2012007358 A1 | 1/2012 |
|---|---|---|
| WO | 2012/171023 A1 | 12/2012 |
| WO | 2012171034 A1 | 12/2012 |
| WO | 2013007396 A1 | 1/2013 |

OTHER PUBLICATIONS

"Aviation Partners Unveils the Shapes of the Future" https://www.aviationpartners.com/aviation-partners-unveils-shapes-future/, dated Oct. 2011.
"Aviation Partners, Inc. Displayed New Winglet Shape at NBAA—TLG Aerospace" https://www.tlgaerospace.com/aviation-partners-displayed-winglet-shape-nbaa/, dated Oct. 18, 2011.
"FlightBlogger—Aviation Partner's Blended Split Winglet," dated Oct. 17, 2011.
"Jane's All the World's Aircraft 1979-80", pp. 381-383, copyright 1979.
"Jane's All the World's Aircraft 1983-84", pp. 383-387, copyright 1983.
"NBAA 2011—Blended Split Winglets—LVCC—Las Vegas, NV." dated Oct. 11, 2011.
"NBAA 2011 Tuesday Headlines" dated Oct. 10, 2011.
"NBAA2011 Online News Bureau." dated Oct. 12, 2011.
Anon, Images 1-7: Photos from Winglets (Date unknown).
Boeing MD-80 Technical Specification, May 2011.
CA 2,728,765 filed Dec. 20, 2010 Examination Report dated May 6, 2016.
CA 2,728,765 First Examination Report dated Jun. 4, 2015.
CA 2838848 filed Dec. 9, 2013 Office Action dated Mar. 27, 2018.
CA 2838848 filed Dec. 9, 2013 Office Action dated Sep. 10, 2019.
CA 2839492 filed Dec. 16, 2013 Office Action dated Dec. 27, 2018.
CA 2839492 filed Dec. 16, 2013 Office Action dated Mar. 16, 2018.
CN 200980132637.3 filed Feb. 21, 2011 First Office Action dated Dec. 25, 2012.
CN 200980132637.3 filed Feb. 21, 2011 Second Office Action dated Aug. 19, 2013.
CN 200980132637.3 filed Feb. 21, 2011 Third Office Action dated Apr. 10, 2014.
CN 201280038839.3 filed Feb. 8, 2014 First Office Action dated Feb. 2, 2015.
CN 201280038839.3 filed Feb. 8, 2014 Second Office Action dated Sep. 17, 2015.
CN 201280038839.3 filed Feb. 8, 2014 Telephone Notice dated May 9, 2016.
CN 201280038839.3 filed Feb. 8, 2014 Third Office Action dated Jan. 18, 2016.
CN 201280038841.0 filed Feb. 8, 2014 First Office Action dated Jan. 29, 2015.
CN 201280038841.0 filed Feb. 8, 2014 Second Office Action dated Sep. 28, 2015.
CN 201410594345.4 filed Oct. 29, 2014 First Office Action dated Jan. 12, 2016.
CN 201410594345.4 filed Oct. 29, 2014 Office Action dated Sep. 1, 2016.
CN 201610525831.X filed Jul. 5, 2016 Office Action dated Aug. 9, 2019.
CN 201610525831.X filed Jul. 5, 2016 Office Action dated Mar. 20, 2019.
CN 201610525831.X filed Jul. 5, 2016 Office Action dated Nov. 15, 2017.
CN 201610525831.X filed Jul. 5, 2016 Office Action dated Sep. 18, 2018.
CN 201610835894.5 filed Sep. 20, 2016 Office Action dated Nov. 27, 2018.
EP 09767892.4 Extended European Search Report dated Aug. 30, 2013.
EP 09767892.4 filed Jan. 18, 2011 Notice of Opposition Appendix A dated Jul. 2016.
EP 09767892.4 filed Jan. 18, 2011 Notice of Opposition filed against EP2302685 dated Jul. 26, 2016.
EP 09767892.4 filed Jan. 18, 2011 Notice of Opposition supporting document D10 "Wingtip Comparison" dated Dec. 1978.
EP 09767892.4 filed Jan. 18, 2011 Notice of Opposition supporting document D13 "The ETA glider wingtip.pdf" dated Jun. 2006.
EP 09767892.4 filed Jan. 18, 2011 Notice of Opposition supporting document D13A "State of the project" dated Jun. 2016.
EP 09767892.4 filed Jan. 18, 2011 Notice of Opposition supporting document D13B "Sales Information" dated Jun. 2016.
EP 09767892.4 filed Jan. 18, 2011 Notice of Opposition supporting document D2 "Wingtip Design" dated Mar. 1984.
EP 09767892.4 filed Jan. 18, 2011 Notice of Opposition supporting document D5 "Flight Magazine" dated Nov. 1911.
EP 09767892.4 filed Jan. 18, 2011 Notice of Opposition supporting document D9 "Wing Tip Design" dated Dec. 1978.
EP 12 796 526.7 filed Jan. 8, 2014 Extended European Search Report dated Feb. 26, 2015.
EP 12 797 495.4 filed Dec. 19, 2013 Extended European Search Report dated Mar. 5, 2015.
EP 12 797 495.4 filed Dec. 19, 2013 Intent to Grant dated Sep. 18, 2017.
EP 13161204.6 filed Jul. 7, 2011 European Search Report dated May 17, 2011.
EP 14198530.9 filed Dec. 17, 2014 Extended European Search Report dated May 12, 2015.
EP 15830283.6 filed Feb. 16, 2017 Extended European Search Report dated Nov. 27, 2017.
EP 18156922.9 filed Feb. 15, 2018 Extended European Search Report dated Jun. 12, 2018.
EP 18158836.9 filed Feb. 27, 2018 Extended European Search Report dated May 30, 2018.
Flight NBAA 2011: Convention Photo Gallery 2011 (Feb. 23, 2018).
Flight NBAA: Split winglets latest Evolution from Aviation Partners from Flight Oct. 13, 2011 (Dec. 12, 2018).
Fredericks "Aviation Partners unveil new designs" dated Oct. 11, 2011.
Gilkey, R. D. et al., "Design and Wind Tunnel Tests of Winglets on a DC-10 Wing," Apr. 1979, 52 pages.
Huber, "API displaying trio of blended winglets here" dated, Oct. 12, 2011.
Jameson, A., "Aerodynamic Design," Prceedings Computational Science for the 21st Centuty, May 1997, 16 pages.
Jameson, Antony, "Re-Engineering the Design Process Through Computation," Journal of Aircraft, vol. 36, No. 1, Jan.-Feb. 1999, pp. 36-50.
Kroo, I., "Nonplanar Wing Concepts for Increased Aircraft Efficiency," CKI Lecture Series on Innovative Configurations and Advanced Concepts for Future Civil Aircraft, Jun. 6-10, 2005.
McDonnell Douglas Press Release, "McDonnell Douglas Unveils New MD-XX Trijet Design," Sep. 4, 1996, 1 page.
Morris, "Aviation Partners Sets World Record—without winglets." Oct. 10, 2017.
Nangia, R. J. et al., "Aerodynamic Design Studies of Conventional & Unconventional Wings with Winglets," 24th Applied Aerodynamics Conference, Jun. 5-8, 2006, 18 pages.
Norris, Guy et al., "Shaping up," Aviation Week, May 7, 2012, pp. 37-38, vol. 174, No. 16.
PCT/EP2011/061552 filed Jul. 7, 2011 International Search Report and Written Opinion dated Oct. 7, 2011.
PCT/US2009/048065 filed Jun. 19, 2009 International Search Report dated Aug. 17, 2009.
PCT/US2009/048065 filed Jun. 19, 2009 Written Opinion and International Preliminary Report on Patentability dated Aug. 17, 2009.
PCT/US2012/041936 filed Jun. 11, 2012 International Search Report and Written Opinion dated Aug. 31, 2012.
PCT/US2012/041961 filed Jun. 11, 2012 International Preliminary Report on Patentability dated Dec. 27, 2013.
PCT/US2012/041961 filed Jun. 11, 2012 International Search Report and Written Opinion dated Sep. 6, 2012.

(56) References Cited

OTHER PUBLICATIONS

PCT/US2015/043819 filed Aug. 5, 2015 International Search Report and Written Opinion dated Oct. 16, 2015.
RU 2017105216 filed Feb. 17, 2017 Office Action dated Feb. 28, 2019.
Starlionblue (Jun. 10, 2009) Could Boeing Reconsider the MD-12? [MSG 11]. Message posted to http://www.airliners.net/aviation-forums/general_aviation/read.main/4443449/2/#menu27.
Tibbits, George (May 16, 1992) Superjumbo Jets Are Ocean Liners for the Skies. Casa Grande Arizona Dispatch, p. 12.
Trucchi, Marco, "Fluid Mechanics of Yacht Keels," Dec. 18, 1996.
U.S. Appl. No. 12/488,488, filed Jun. 19, 2009 Advisory Action dated Feb. 27, 2011.
U.S. Appl. No. 12/488,488, filed Jun. 19, 2009 Final Office Action dated Dec. 6, 2012.
U.S. Appl. No. 12/488,488, filed Jun. 19, 2009 Final Office Action dated Feb. 14, 2012.
U.S. Appl. No. 12/488,488, filed Jun. 19, 2009 Non-Final Office Action dated Jul. 3, 2012.
U.S. Appl. No. 12/488,488, filed Jun. 19, 2009 Non-Final Office Action dated Oct. 13, 2011.
U.S. Appl. No. 13/493,843, filed Jun. 11, 2012 Advisory Action dated Apr. 21, 2014.
U.S. Appl. No. 13/493,843, filed Jun. 11, 2012 Final Office Action dated Feb. 14, 2014.
U.S. Appl. No. 13/493,843, filed Jun. 11, 2012 Final Office Action dated Sep. 26, 2014.
U.S. Appl. No. 13/493,843, filed Jun. 11, 2012 Non-Final Office Action dated Jun. 11, 2014.
U.S. Appl. No. 13/493,843, filed Jun. 11, 2012 Non-Final Office Action dated Oct. 7, 2013.
U.S. Appl. No. 13/493,915, filed Jun. 11, 2012 Advisory Action dated Nov. 19, 2014.
U.S. Appl. No. 13/493,915, filed Jun. 11, 2012 Non-Final Office Action dated May 23, 2014.
U.S. Appl. No. 13/493,915, filed Jun. 11, 2012 Non-Final Office Action dated Sep. 11, 2014.
U.S. Appl. No. 14/452,424, filed Aug. 5, 2014 Non-Final Office Action dated Aug. 13, 2015.
U.S. Appl. No. 14/610,452, filed Jan. 30, 2015 Appeal Board Decision dated Mar. 15, 2018.
U.S. Appl. No. 14/610,452, filed Jan. 30, 2015 Examiner's Answer dated Oct. 7, 2016.
U.S. Appl. No. 14/610,452, filed Jan. 30, 2015 Final Office Action dated Feb. 1, 2016.
U.S. Appl. No. 14/610,452, filed Jan. 30, 2015 Non-Final Office Action dated Sep. 24, 2015.
U.S. Appl. No. 15/090,541, filed Apr. 4, 2016 Final Office Action dated Dec. 15, 2017.
U.S. Appl. No. 15/090,541, filed Apr. 4, 2016 Non-Final Office Action dated Oct. 25, 2017.
U.S. Appl. No. 15/148,992, filed May 6, 2016 Non-Final Office Action dated May 22, 2018.
U.S. Appl. No. 15/148,992, filed May 6, 2016 Notice of Allowance dated Oct. 26, 2018.
U.S. Appl. No. 15/256,719, filed Sep. 5, 2016 Notice of Allowance dated Oct. 27, 2016.
U.S. Appl. No. 16/019,010, filed Jun. 26, 2018 Non-Final Office Action dated Aug. 10, 2018.
U.S. Appl. No. 16/167,259, filed Oct. 22, 2018 Non-Final Office Action dated Dec. 31, 2018.
U.S. Appl. No. 16/378,303, filed Apr. 8, 2019 Non-Final Office Action dated Aug. 1, 2019.
Whitcomb, Richard T., "A Design Approach and Selected Wind-Tunnel Results at High Subsonic Speeds for Wing-Tip Mounted Winglets," NASA Technical Note, Jul. 1976.
Wilhelm, Steve, "Winglet's Split Personality," Puget Sound Business Journal, Aug. 16-22, 2013.

\* cited by examiner

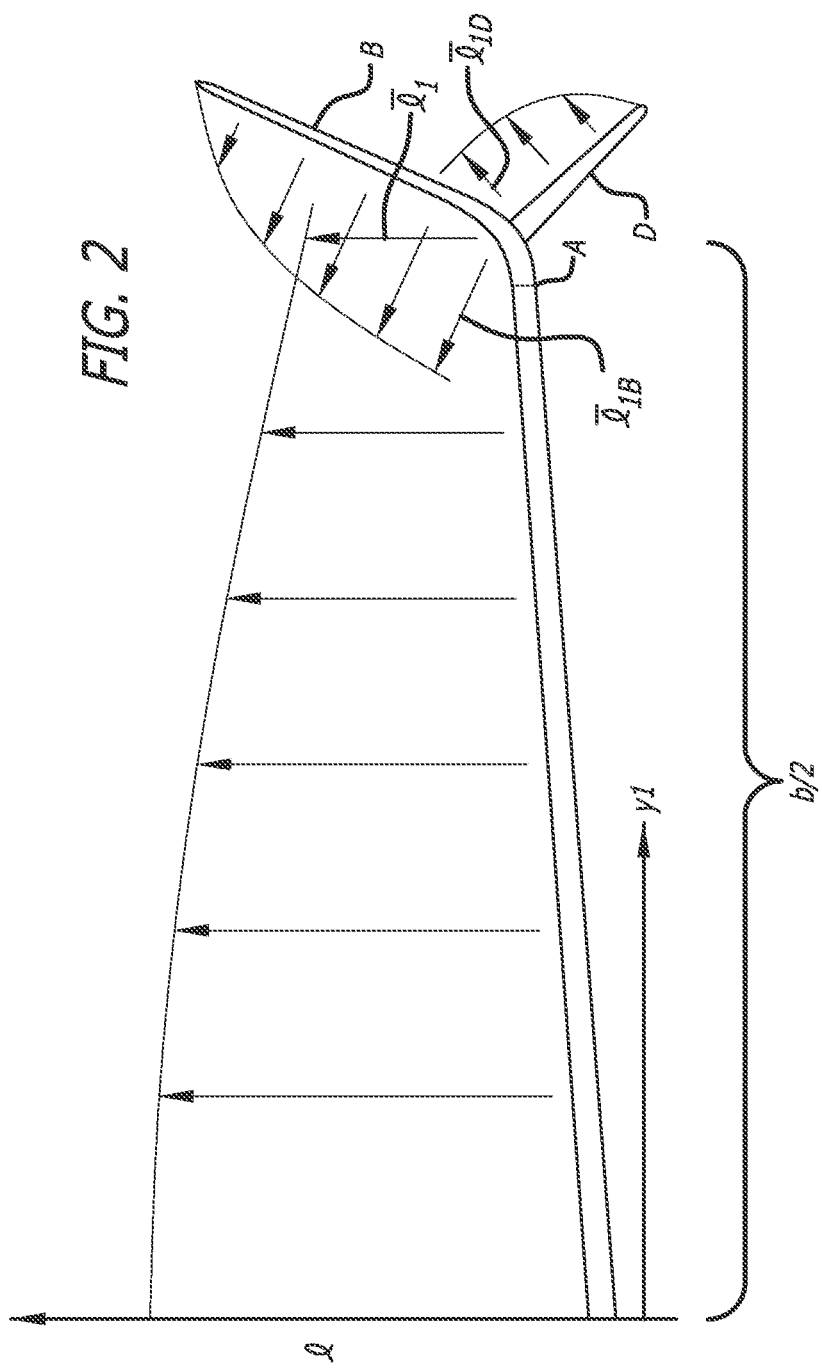

WING TIP WITH WINGLET AND VENTRAL FIN

PRIORITY

This application is a continuation of U.S. patent application Ser. No. 16/167,259, filed Oct. 22, 2018, now U.S. Pat. No. 10,377,472, which is a continuation of U.S. patent application Ser. No. 14/610,452, filed Jan. 30, 2015, now U.S. Pat. No. 10,106,247, which is a continuation of U.S. patent application Ser. No. 13/493,843, filed Jun. 11, 2012, now U.S. Pat. No. 8,944,386, which claims the benefit of priority to U.S. Provisional Application No. 61/495,236, filed Jun. 9, 2011, each of which is incorporated by reference in its entirety into this application.

BACKGROUND

Winglets are generally upwardly sloping ends of a generally planar wing. Winglets reduce drag generated by wingtip vortices. However, winglets produce lift that increases the bending moment on the wing.

Various wing tip devices and geometries are described, for example, in U.S. Pat. No. 7,971,832 (titled "Wing Tip Devices," issued Jul. 5, 2011), U.S. Pat. Pub. No. 2007/0114327 (titled "Wing Load Alleviation Apparatus and Method," published May 24, 2007), U.S. Pat. No. 6,722,615 (titled "Wing Tip Extension for a Wing," issued Apr. 20, 2004), U.S. Pat. No. 6,827,314 (titled "Aircraft with Active Control of the Warping of Its Wings," issued Dec. 7, 2004), U.S. Pat. No. 6,886,778 (titled "Efficient Wing Tip Devices and Methods for Incorporating such Devices into Existing Wing Designs," issued May 3, 2005), U.S. Pat. No. 6,484,968 (titled "Aircraft with Elliptical Winglets," issued Nov. 26, 2002), U.S. Pat. No. 5,348,253 (titled "Blended Winglet," issued Sep. 20, 1994), each of which is incorporated by reference into this application as if fully set forth herein.

SUMMARY

An innovative winglet concept is described herein including a split winglet, which includes separate extensions above and below the wing chord plane. The split winglet includes an upward sloping element similar to an existing winglet and a down-ward canted element (ventral fin). The ventral fin counters vortices generated by interactions between the wingtip and the lower wing surface.

The split winglet is designed to reduce drag but without generating the increased bending moment found in existing winglet designs. The split winglet design is believed to improve fuel burn or reduce fuel burn by approximately 1.5%, reduce drag by up to 9.5% over an unmodified wing, and improve cruise performance by more than 40% over existing blended-winglet configurations.

Embodiments as described herein are adaptable to various wing and wing tip designs. Embodiments may include an integrated split blended winglet that attaches as a single unit at a wing tip, or may include a separate ventral fin designed to attach to an existing blended winglet.

BRIEF DESCRIPTION OF THE DRAWINGS

The disclosed systems and methods can be better understood with reference to the following drawings. The components in the drawings are not necessarily to scale.

FIG. 2 illustrates the principal characteristics of an exemplary load distribution for the wing with split winglet according to embodiments of the invention.

BRIEF DESCRIPTION OF THE DRAWINGS

The blended winglet produces superior drag reduction results and other improvements in airplane performance. Embodiments of the split winglet, as described herein, provide additional performance benefits with essentially no change in the structural support needed beyond that required by the basic blended winglet design. The split winglet generally involves the placement of an additional surface below the wing chord plane. In one embodiment, the additional surface is integrally configured with the curved winglet. In another embodiment, a ventral fin is an add-on to an existing blended winglet. The following description and accompanying figures, which describe and show certain embodiments, are made to demonstrate, in a non-limiting manner, several possible configurations of a split winglet according to various aspects and features of the present disclosure.

Figure 1B:
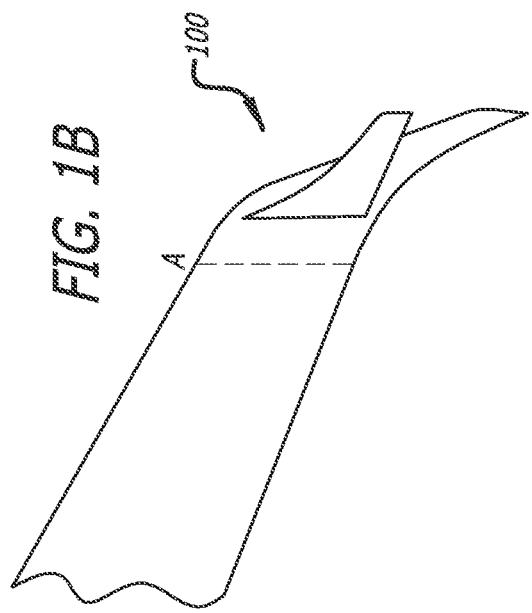
FIGS. 1A-C are three-view illustrations of an exemplary split winglet according to embodiments of the invention.
Figure 1A:
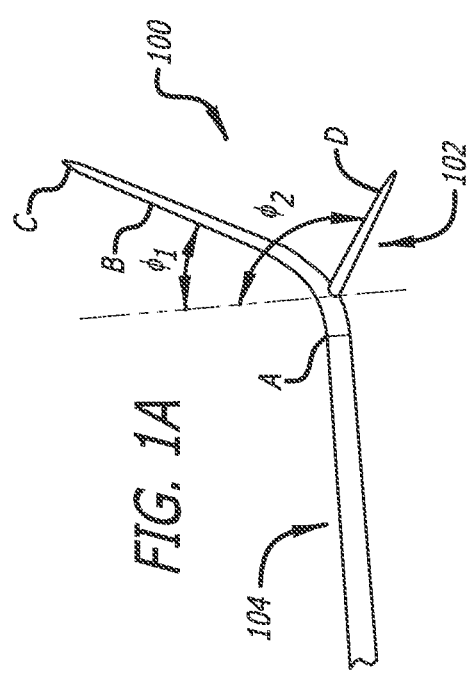
Figure 1C:
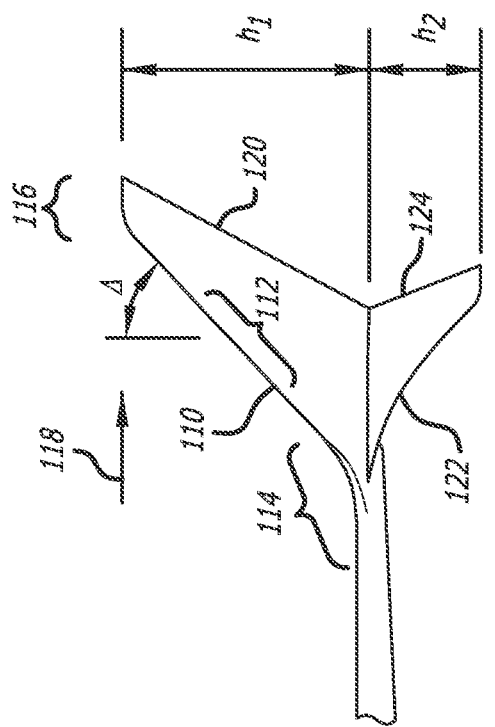

FIG. 1 is a three-view illustration of an exemplary split winglet. FIG. 1A is a front view of the exemplary winglet 100 with ventral fin 102; FIG. 1B is a bottom view; and FIG. 1C is a side view. The winglet includes a primary surface attached to the wing 104 at A that has the geometric characteristics of a blended winglet including a near-planar outer panel B, a tip configuration C, and a transition section A-B between the wing and winglet outer panel. A ventral fin 102 projects below the wing chord plane and includes a ventral surface D.

In an exemplary embodiment, the winglet geometry can vary within the usual range (i.e., size ($h_1$), cant ($\phi_1$), sweep ($\Lambda_1$), camber ($\varepsilon$), and twist ($\theta$)) without significant compromise to the optimization of the ventral surface D or the overall performance of the split winglet. The tip section, C, geometry for each surface may be individually designed to provide elliptical tip loading corresponding to each surface loading.

The outer panel B is designed to carry most of the load. The outer panel B is approximately planar, projecting from the wing tip at a cant angle $\phi_1$. The leading edge E of the outer panel B is swept rearward at an angle $\Lambda_1$. The outer panel B extends to a height $h_1$ above the plane of the wing 104. The transition section A-B between the wing and winglet outer panel is optimized to minimize aerodynamic interference. In an exemplary embodiment, the transition section A-B is generally a near-radial curve with a curvature radius of r. The tip configuration C is optimized for elliptical loading.

The ventral surface D is sized and oriented to conform to certain physical constraints and optimized to provide a loading corresponding to maximum benefit with minimal effect on the wing bending moment. The ventral fin 102 projects from the transition section A-B of the curved winglet. The ventral surface D linearly projects from the curved winglet at a cant angle $\phi_2$. The ventral fin 102 creates a downward projecting surface a distance $h_2$ below the wing plane.

The drag reduction due to the split winglet is significantly better than for the blended winglet of the same size as the primary surface B. This increment can be 2% or more when the length of the ventral surface D is about 0.4 the height of the primary surface ($h_2=0.4 \times h_1$). Other aerodynamic characteristics are similarly enhanced, which result in higher cruise altitude, shorter time-to-climb, improved buffet margins, reduced noise, and higher second segment weight limits. No adverse effects on airplane controllability or handling qualities are expected.

Any improvement in structural stiffness characteristics of the wing will result in an additional drag benefit corresponding to a reduction in wing aeroelastic twist. The drag benefit will increase if the wing has available structural margin or the wing can be structurally modified to allow increased bending moment. The tradeoff between wing modification and drag reduction can be favorable for modest increases in bending moment beyond that produced by the winglet alone.

The ventral fin 102 may emanate from the wing plane at generally the same spanwise wing location as the upward projecting curved wing tip. The ventral fin 102 may also emanate from other locations along the wing tip, including along the transition section A-B or the lower facing surface of the outer panel B. For example, the ventral fin may emanate from a general midpoint of the radial A-B transition.

In an exemplary embodiment, the upward projecting curved wing tip may continuously transition from the wing. The upward projecting winglet may include a section that continuously extends the upper and lower surfaces of the wing along the leading and trailing edges such that the upward projecting winglet smoothly integrates with the wing surfaces. The upward projecting winglet may continuously and smoothly curve upward to seamlessly transition from the wing profile to the generally planar wing tip profile. The upward projection wing tip then extends generally planar at an angle with respect to vertical and terminates at the winglet tip. The leading edge 110 of the upward projecting winglet may include a generally linear section 112 swept at an angle $\Lambda_1$. The leading edge 110 may continuously and smoothly transition from the leading edge of the wing to the generally linear section 112 at section 114. The leading edge may then curve from the generally linear section 112 at 116 so that the leading edge approaches the air stream direction 118, generally parallel to the airplane body (not shown). The upward projecting winglet trailing edge 120 may be a generally linear and transition in a curved and upward direction to continuously transition from the wing trailing edge to the winglet trailing edge. The winglet may be swept and tapered to a greater extent than the wing.

The ventral fin may be a generally planar projection below the upper curved winglet and extend generally below the plane of the wing at an angle with respect to vertical. The ventral fin may be generally wing shaped, such that it is swept and tapered. The ventral fin leading edge 122 may be generally linear extending from the curved winglet and transition along a continuous curve toward the air stream direction 118 at the ventral fin tip. The trailing edge of the ventral fin may be generally linear. In one embodiment, the ventral fin leading edge 122 may be generally curved so that the discontinuity between the wing surface and the ventral fin is reduced. Therefore, the leading edge 122 may be closer to the surface of the winglet, transition away from the wing surface to the generally linear section, and then finally transition to the tip shape.

The chord length of the ventral fin at an attachment location with the wing may be equal to or less than the chord length of the wing or upward projecting wing tip at the attachment location. As seen in FIG. 1B, the chord length of the ventral fin is less than the chord length of the curved winglet portion at the attachment location. The trailing edge of the ventral fin emanates from a point along the trailing edge of the curved winglet. The leading edge of the ventral fin emanates from a bottom surface of the curved winglet.

In an exemplary embodiment, the split winglet may be integrated such that the curved winglet and ventral fin are designed as a continuous wing tip structure. The curved winglet therefore creates an upward projecting surface and the ventral fin creates a lower projecting surface. The ventral surface D may project from a lower surface of the curved winglet at a near linear profile. The intersection of the curved winglet and ventral fin is continuous to constitute a blended intersection to minimize aerodynamic interference and produce optimal loading. The curved winglet and the ventral fin may emanate from the same spanwise wing location.

In an exemplary embodiment, the ventral fin may be separately attached to the wing by attachment to either the wing or curved winglet already projecting from the wing tip. The ventral fin may be bolted or otherwise attached to the wing tip section. The ventral fin 102 may include a ventral surface D that is generally linear. The ventral fin may be attached to the curved winglet near the mid-point of the transition section A-B of the curved winglet. The ventral fin 102 may project below the wing.

In accordance with the geometries and design considerations described above, FIG. 2 illustrates the principal characteristics of the load distribution for the wing with split winglet. The load distribution is optimized with the primary surface, B, load directed inboard and the load on the ventral surface D directed outboard. This provides the maximum drag benefit for any combination of primary and ventral surface sizing for which loads do not exceed limits established by the wing structural capability. The loading of the primary surface B and ventral surface D are generally elliptical. The loading at the end of the primary surface B and ventral surface D approaches zero, while the origin of these surfaces from the wing surface bear the greater load. The load at the wing tip, indicated as $l_1$, is generally equal to the total of the loading at the origin of the primary surface B and ventral surface D, (i.e. $l_{1B}+l_{1D}$).

Figure 3B:
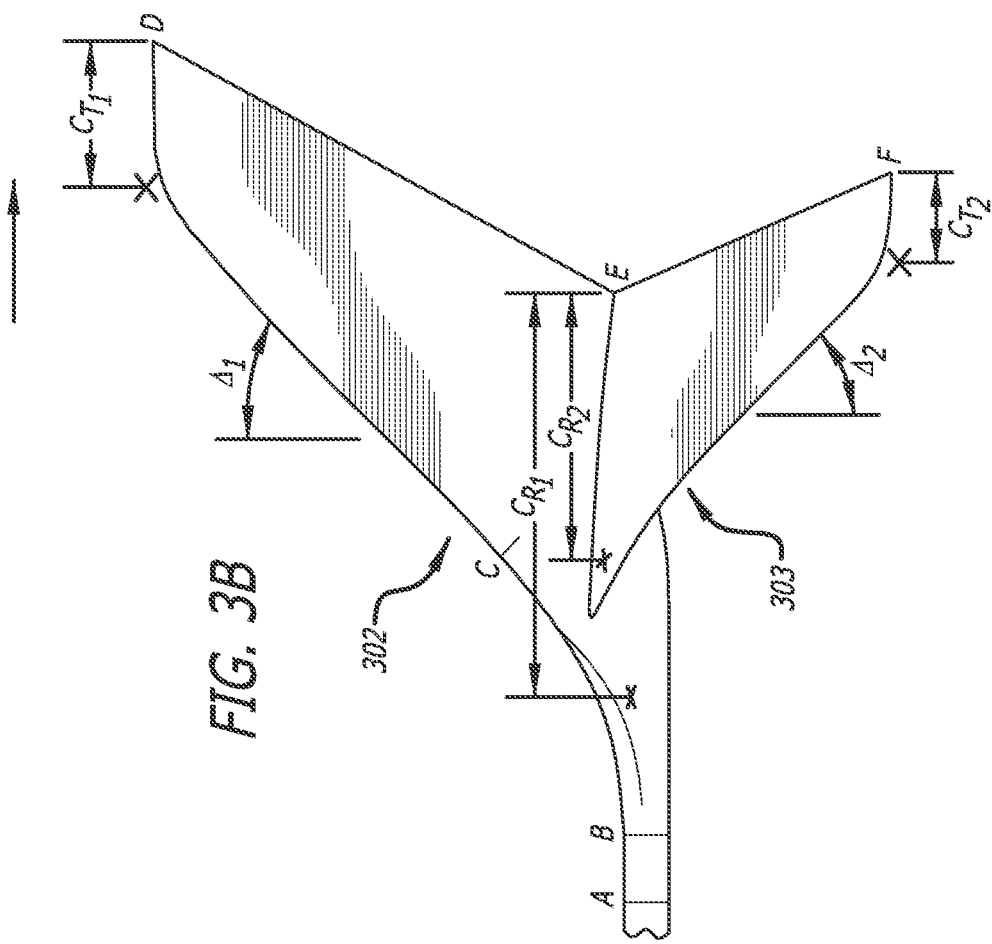
FIGS. 3A-B are two-view illustrations of an exemplary integrated split winglet according to embodiments of the invention.
Figure 3A:
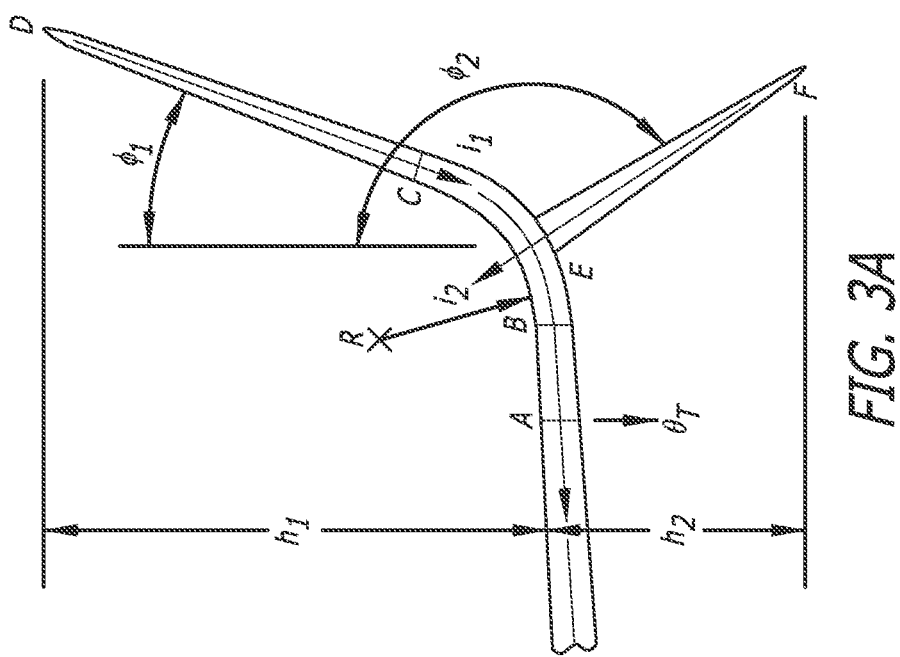

FIG. 3 illustrates an exemplary integrated split winglet according to embodiments of the invention. FIG. 3A illustrates an exemplary front view of the winglet, while FIG. 3B illustrates an exemplary side view. The exemplary integrated split winglet is conceived as a unit that may be attached directly to the wing tip at location A. However, it is apparent that it is easily separable into two or more parts, including the upper element that closely resembles a blended winglet and a lower element, the ventral fin, that is attachable to the first element at a transition between the winglet upper element and the wing tip (i.e. transition section BC).

The upper element generally consists of an adapter section (AB), a transition section (BC), and a blade section (CD). The adapter section AB is configured to fit the split winglet onto an existing wing end, and generally corresponds to the wing surface extending from A. As viewed from above, the adapter section AB will be generally trapezoidal. The transition section BC provides for a continuous transition surface between the extended wing surface at B and the blade section at C. The transition section BC has a radius of curvature R that may be variable. The blade section CD is generally planar and is designed to carry most of the load. The different sections are serially connected to form the first element delineated by continuous leading edge and trailing edge curves that bound upper and lower surfaces to form a solid body having an airfoil cross section.

The transition section BC may have a variable radius along its length; therefore, the section may be described in terms of an average radius, $R_A$, and a minimum radius, $R_M$, at any point along the transition. The transition section BC of the upper element may have an average radius of curvature, $R_A$ of the principle spanwise generator and a minimum radius of curvature at any point, $R_M$, which meets the criteria:

$$\frac{R_A}{h} = K_A \frac{1}{\sqrt{1+\sin\phi_1}};$$

Where, $K_A$ is preferably between 0.25 and 0.7 and more preferably between 0.25 and 0.35. The ratio of the minimum to the average radius, $R_M/R_A$, is preferably between 0.3 and 1.0 and more preferably between 0.5 and 1.0.

The airfoil geometry of the transition section BC near the leading edge is constrained by the following relationships between leading edge sweep angle, $\Lambda$, airfoil nose camber, $\eta$, and chordwise extent of nose camber, $\xi T$:

$$\eta/n_o = \left(1 - \frac{\xi}{\xi_\tau}\right)^2;$$

$$0 < \xi < \xi_\tau$$

$$n_o = .1\xi_\tau = .006\tan^{1/3}\Lambda$$

The lower element generally consists of the ventral fin, EF. The lower element has a generally wing-like configuration attached to the first element. The lower element may be attached to the first element along transition section BC at a generally 90° angle that allows adjustment of the second element relative to the local wing vector.

The general geometry of both the upper (identified by subscript 1) and lower (identified by subscript 2) elements are defined by a height from the wing plane ($h_1$ and $h_2$); cant angle ($\phi_1$, $\phi_1$); incidence angle ($i_1$, $i_2$); sweep angle ($\Lambda_1$, $\Lambda_2$); and blade taper ($\lambda_1$, $\lambda_2$). The geometry determines the aerodynamic loading, which is critical to enhancement of the airplane performance characteristics. Generally, the geometric parameters are selected to minimize drag without incurring structural and weight changes that will offset or compromise the drag benefits or adversely affect other characteristics. The optimization process results in the optimum combination of independent geometric parameters while satisfying the constraints that apply to the dependent design parameters selected for a given application. The above identified parameters are mostly independent parameters, although they may be considered dependent for certain applications. Additional dependent parameters include, loading split ratio, allowable wing bending moment, extent of structural modification, winglet size, airplane operating limitations, economic and business requirements, and adaptability. The design restrictions for optimization of the split blended winglet will be more complex than the traditional blended winglet technology.

The upper and lower elements are oriented at a cant angle with respect to the wing normal. The cant angle of the upper surface is generally between zero and fifty degrees (i.e. $0°<\phi_1<50°$, while the cant angle of the second element is between ninety and one hundred eight degrees (i.e. $90°<\phi_2<180°$).

Each of the first and second elements include a tapered near-planar section. These sections include a taper ratio generally in the range of approximately 0.28 and 0.33 for the first element (i.e. $0.28<\lambda_1<0.33$) and approximately 0.33 and 0.4 for the second element (i.e. $0.33<\lambda_2<0.4$). The split winglet includes a surface area corresponding to a design lift coefficient $C_L$ in the range of approximately 0.6 and 0.7 (i.e. $0.6<C_{LW}<0.7$) and a thickness ratio corresponding to the section life coefficient which meets the following criteria at the design operating condition:

Winglet $M_{crit}$=Wing $M_{crit}$+0.01.

The leading edge 302 and 303 curves of both the upper and lower elements monotonically varies with a leading edge sweep angle up to 65°. The leading edge curve and sweep angle are correlated with airfoil section nose camber to prevent or reduce formation of leading edge vortices. These elements may be limited in cant angle, curvature, height and surface area to maintain optimum performance over the flight envelope with minimum impact on wing structural requirements which affect weight, cost, and airplane economics.

Figure 4:
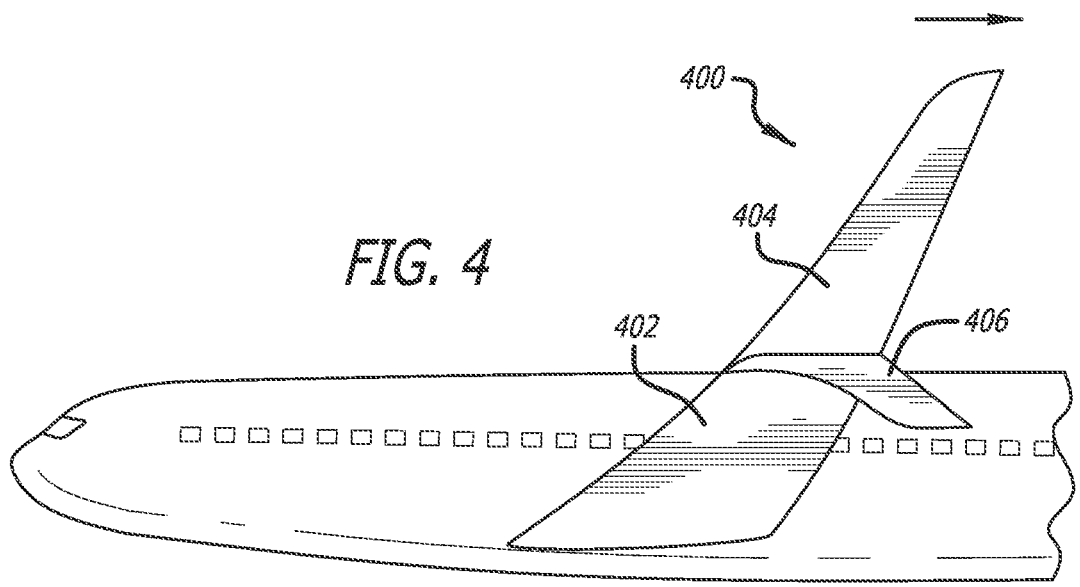
FIG. 4 illustrates an exemplary embodiment of the split winglet design as attached to an airplane.

FIG. 4 illustrates another embodiment of the split winglet design. As seen in FIG. 4, the split winglet 400 is a continuous projection of the wing 402 in an upper section 404 extending above the wing 402 plane and a lower section 406 below the wing 402 plane. The leading edges of the upper section and lower section emanate from a common point along the leading edge of the wing tip; while the trailing edges of the upper and lower section similarly emanate from a common point along the trailing edge of the wing tip. The leading edges of both the upper and lower portions may have a generally linear portion with a smooth curved transition from the wing to the linear portion. The winglet tips of the upper and lower portions may curve toward the free stream air direction (indicated by arrow on FIG. 4). The trailing edges may generally project linearly to the respective winglet portion ends. The trailing edges of the upper and/or lower portions may also include a curved section from the common point to reduce the chord length of the respective portion so that the taper of the upper and lower portions is variable and may be greater along a portion of the upper and/or lower portion than from the wing. The upper and lower surfaces of the wing extend continuously onto the upper and lower surfaces of the upper portion and lower portion of the winglet, respectively. The junction between the lower surface of the upper portion and the upper surface of the lower portion may also be continuous.

Figure 5:
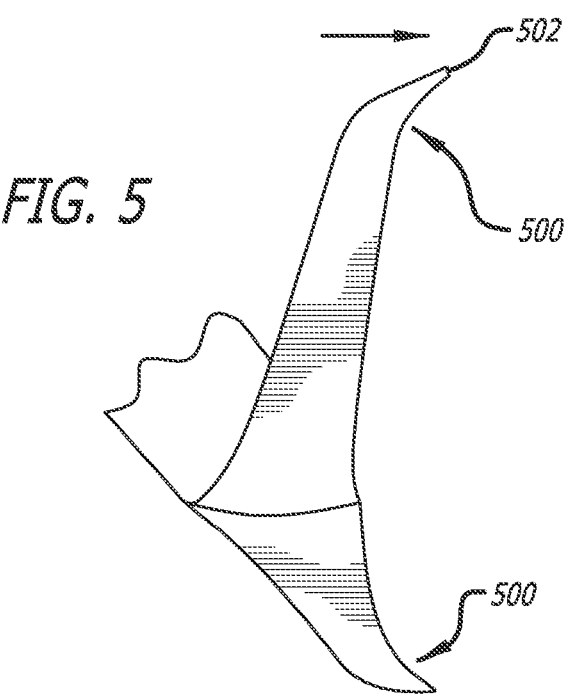
FIG. 5 illustrates an exemplary split winglet including a different tip configuration according to embodiments of the invention.

FIG. 5 illustrates an exemplary split winglet including a different tip configuration 500. The upper and lower winglet sections may have various designs, including the leading and trailing edges, the winglet surface contours, transition profile between the winglet and the wing, and the winglet tip profiles. As previously disclosed, the leading and trailing edges of the winglet portions may be continuous extensions of the wing leading and trailing edges. The taper of the winglet sections may also be greater than that of the wing and may be variable long its length. For a continuous leading and trailing edge design, the transition to the greater taper may occur along either the leading edge, or trailing edge, or a combination of both. The lower portion, i.e. ventral fin, may have the same chordwise span as the upper winglet portion and wing, or may be reduced, such that either the leading and/or trailing edge of the ventral fin extends from a lower surface of either the wing or upper curved winglet portion. The winglet tips 500 may also include various formations and curvatures, depending on the application. As shown in FIG. 5, an additional tip edge 502 may be included between the leading and trailing edge. The leading and/or trailing edges of either or both of the upper and lower portions of the winglet may also be curved toward the free stream air direction. U.S. Pat. No. 9,381,999, titled "Wing Tip with Optimum Loading," incorporated herein by reference in its entirety, describes alterative winglet tip designs applicable to the present split winglet tip.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. An attachment end of the winglet is described. The winglet may be integrally formed or may be separately bolted together. The attachment end, therefore, is taken to include an end to a separate winglet assembly that is bolted or otherwise separately attachable to an existing wing, or may be integrally formed with a wing through a curved winglet. The attachment end of the winglet would then be a boundary between the winglet structure and the existing wing plane, attachable through the integral nature of the wing and winglet. The terms attach and connected and coupled are used interchangeable to include any direct or indirect attachment between structures. Embodiments as described herein are generally described in reference to end profiles for airplane wings. The invention is not so limited and may be used in other aircraft where drag induced from a surface end presents concerns.

What is claimed is:

1. A method of improving performance of an aircraft, comprising:
   obtaining a wing tip, the wing tip comprising:
      a winglet, comprising:
         a winglet leading edge;
         a winglet trailing edge;
         an adapter section;
         a transition section attached to the adapter section;
         a blade section attached to the transition section; and
         a first tip section attached to the blade section; and
      a ventral fin coupled to the winglet at an attachment location adjacent the transition section, the ventral fin comprising a second tip section; and
   attaching the wing tip to a wing of the aircraft, the wing having a wing leading edge and a wing trailing edge in a wing chord plane, the attaching comprising connecting the adapter section of the winglet to the wing, wherein:
      the winglet leading edge continuously transitions from the wing leading edge,
      the winglet trailing edge continuously transitions from the wing trailing edge,
      the blade section extends above the wing chord plane,
      the ventral fin extends below the wing chord plane,
      the first tip section has a leading edge curved toward a freestream air direction, and
      the second tip section has a leading edge curved toward the freestream air direction.

2. The method according to claim 1, wherein the winglet leading edge is swept rearward after the wing tip is attached to the wing of the aircraft.

3. The method according to claim 2, wherein the ventral fin of the wing tip comprises a ventral fin leading edge swept rearward, the ventral fin leading edge including a curved portion and a linear portion, the linear portion extending between the curved portion and the second tip section.

4. The method according to claim 1, wherein the adapter section and the blade section of the winglet are generally planar, and wherein the transition section of the winglet is generally curved.

5. The method according to claim 1, wherein the ventral fin of the wing tip includes a ventral fin trailing edge coupled to the winglet at the winglet trailing edge.

6. The method according to claim 1, wherein a chord length of the ventral fin is less than a chord length of the winglet at the attachment location.

7. The method according to claim 1, wherein connecting the adapter section to the wing results in an angle between the wing along the wing chord plane and the winglet of generally between 90 degrees and 140 degrees.

8. The method according to claim 1, wherein the transition section of the winglet has a variable radius along a length thereof.

9. The method according to claim 8, wherein the variable radius comprises an average radius of curvature and a minimum radius of curvature, and wherein the ratio of the minimum radius of curvature to the average radius of curvature is between 0.3 and 1.0.

10. A method of improving performance of an aircraft, comprising:
   obtaining a winglet, the winglet comprising:
      a winglet leading edge;
      a winglet trailing edge;
      an adapter section;
      a transition section attached to the adapter section;
      a blade section attached to the transition section; and
      a first tip section attached to the blade section;
   attaching the winglet to a wing of the aircraft, the wing having a wing leading edge and a wing trailing edge in a wing chord plane, the attaching comprising connecting the adapter section of the winglet to the wing, wherein:
      the winglet leading edge continuously transitions from the wing leading edge,
      the winglet trailing edge continuously transitions from the wing trailing edge,
      the blade section extends above the wing chord plane, and
      the first tip section has a leading edge curved toward a freestream air direction; and
   coupling a ventral fin to the winglet at an attachment location adjacent the transition section, the ventral fin comprising a second tip section, wherein:
      the ventral fin extends below the wing chord plane, and
      the second tip section has a leading edge curved toward the freestream air direction.

11. The method according to claim 10, wherein the winglet leading edge is swept rearward after the wing tip is attached to the wing of the aircraft.

12. The method according to claim 11, wherein the ventral fin of the wing tip comprises a ventral fin leading edge swept rearward, the ventral fin leading edge including a curved portion and a linear portion, the linear portion extending between the curved portion and the second tip section.

13. The method according to claim 10, wherein the adapter section and the blade section of the winglet are generally planar, and wherein the transition section of the winglet is generally curved.

14. The method according to claim 10, wherein the ventral fin includes a ventral fin trailing edge coupled to the winglet at the winglet trailing edge.

15. The method according to claim 10, wherein a chord length of the ventral fin is less than a chord length of the winglet at the attachment location.

16. The method according to claim 10, wherein connecting the adapter section to the wing results in an angle between the wing along the wing chord plane and the winglet of generally between 90 degrees and 140 degrees.

17. The method according to claim 10, wherein the transition section of the winglet has a variable radius along a length thereof.

18. The method according to claim 17, wherein the variable radius comprises an average radius of curvature and a minimum radius of curvature, and wherein the ratio of the minimum radius of curvature to the average radius of curvature is between 0.3 and 1.0.

\* \* \* \* \*